UNITED STATES PATENT OFFICE.

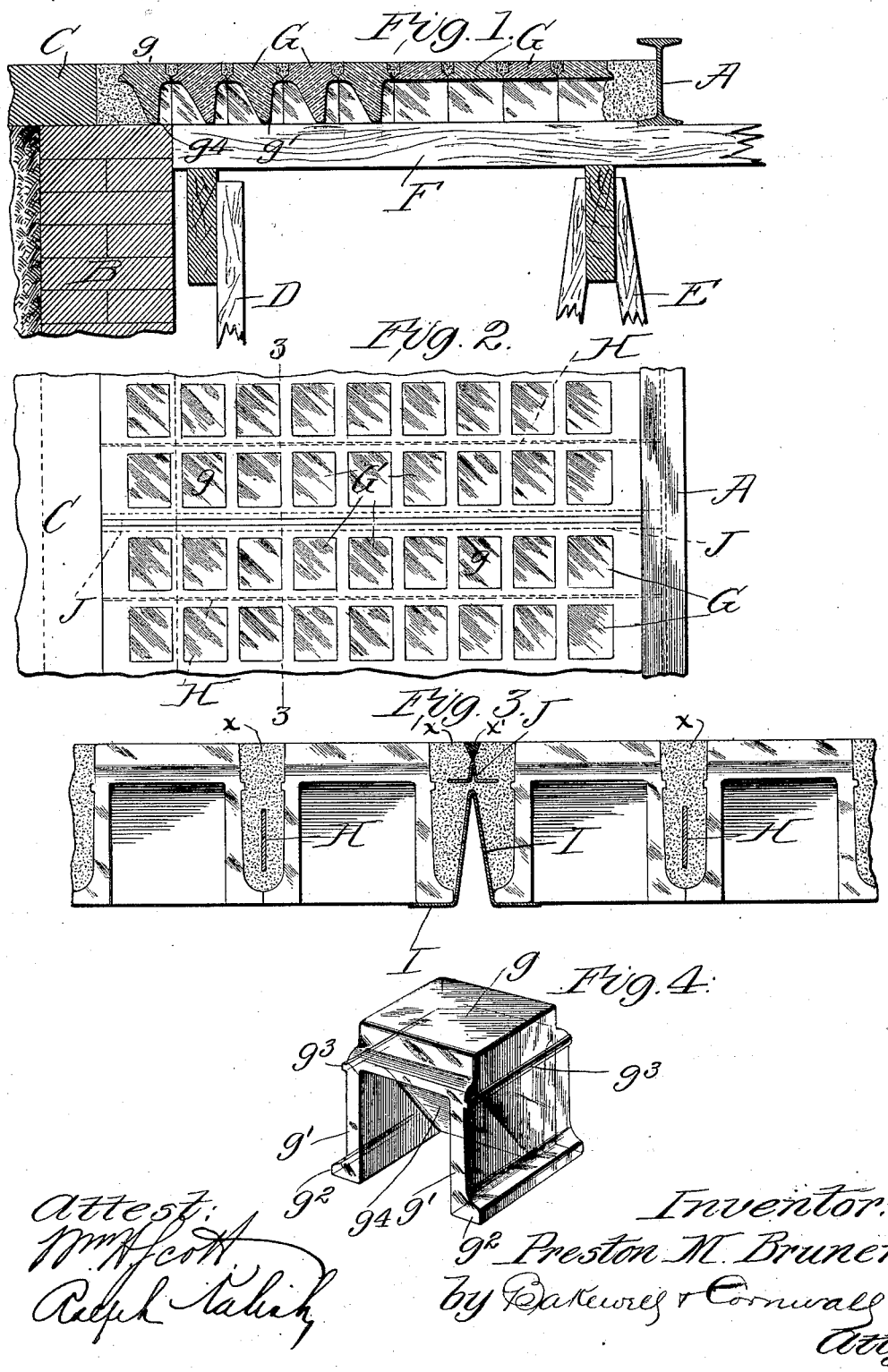

PRESTON M. BRUNER, OF LEBANON, ILLINOIS.

ILLUMINATED AREA-SPANNING PAVEMENT.

SPECIFICATION forming part of Letters Patent No. 693,585, dated February 18, 1902.

Application filed May 22, 1901. Serial No. 61,393. (No model.)

*To all whom it may concern:*

Be it known that I, PRESTON M. BRUNER, a citizen of the United States, residing at Lebanon, St. Clair county, State of Illinois, have invented a certain new and useful Improvement in Illuminated Area-Spanning Pavements, of which the following is a full, clear, and exact description, such as will enable others skilled in the art to which the invention appertains to make and use the same, reference being had to the accompanying drawings, forming part of this specification, in which—

Figure 1 is a sectional view showing the substructure in position. Fig. 2 is a top plan view showing the contiguous ends of two panels of the finished pavement. Fig. 3 is an enlarged sectional view on line 3 3, Fig. 2. Fig. 4 is a detail view of the lens.

This invention relates to a new and useful improvement in illuminated area-spanning pavements, the object being so to construct a pavement that the under surface thereof is made up entirely of glass.

Another object is to dispense with the use of temporary molds for holding the lenses in position during the formation of the pavement.

Another object is to increase the available light-transmitting area, whereby a compartment under the pavement receives more light than is possible with the use of other pavements of this character with which I am familiar.

Heretofore illuminated area-spanning pavements have been constructed wherein the lenses are supported by iron frames, cement being employed around the lenses and on the frame. Where exposed iron plates, bars, or angles are employed to support the lenses, they will in a brief period of time become pitted with rust. The exposed bolts which are employed for tying them to the building and to the adjoining sidewalk or area-coping frequently become so rusted as to render the pavement unsafe. In many cases the cement employed for holding the glass has separated from the ironwork, forming a crust that sounds hollow under the tread of the pedestrian.

In United States Patent No. 588,725, granted to me August 24, 1897, is shown a construction wherein the glass lenses are embedded in the body of the concrete, which necessarily involves means for supporting the lenses in position while the pavement is being built. In the means so employed for this purpose is included a removable substructure which holds the lenses in proper position, and when the cement forming the pavement, with its embedded lenses, is sufficiently strong the substructure is removed. In the practice of my said invention the concrete supporting-ribs, usually about three inches deep and one inch wide, extend outward from building to area wall or to the curb, as the case may be. These ribs are about four and one-half inches apart from center to center, and in addition to holding the glass they form the principal carrying members of the pavement. There are also cross-ribs of concrete; but these extend no deeper than the glass tile in order that they may not obstruct the oblique rays of light entering the basement. The glass tiles used in practicing my said invention are about three inches square and one inch thick. The glass surface in the finished pavement is usually about fifty per cent. of the total area; but this proportion may be increased or diminished. Such a tile construction may be made to bridge a span up to ten feet without auxiliary ironwork.

My present invention contemplates a construction where it is possible to obtain sixty per cent. of the pavement area for light-transmitting purposes, while the lower or under side of the pavement is made entirely of glass and in appearance is much more brilliant than the pavement made in accordance with my aforesaid patent, in that there are no dark lines of the supporting-ribs present, as in the former case.

My present invention also contemplates, in connection with illuminated tile pavements, an expansion-joint, which is an indispensable requirement in the construction of long stretches or panels of such pavements. This joint is so constructed that it is permanently water-tight, the materials forming the joint expanding and shrinking under varying atmospheric conditions. In addition to this my present invention contemplates the employment of deflecting-prisms for a greater diffusion of the transmitted rays of light and for the purpose of deflecting said rays of light back into the basement.

In the accompanying drawings I have illustrated an I-beam A, which, we will assume, is the "building" edge of the areaway, and a wall B, which we will call the "pavement" edge of the areaway, C indicating the sidewalk or pavement. It is obvious that these exact conditions will not be found in all areaways. Any change, however, will be met according to special conditions.

D and E are ground-supports, upon which is arranged, preferably transversely, the areaway, the boards or studding-strips F forming the floor of the substructure. Upon this floor are arranged rows of glasses G. (Shown in detail in Fig. 4.) These glasses consist of a lens portion $g$, with depending legs $g'$ at the sides, said legs being provided with outwardly-projecting flanges or foot portions $g^2$. Slightly below the body of the lens the outer faces of the side walls are provided with key-ribs $g^3$, which key-ribs are considerably shallower than the outwardly-projecting base-flanges. Considering the depending legs as the side walls of the glass, the side edges of the lenses are flush therewith, while the end edges of the lenses are reduced, so as to form a space between the lenses when the glasses are arranged end to end, as shown in Fig. 1, while the ends of the side walls abut against each other throughout the distance of the open space between the legs of the lenses. Between these legs may be arranged a prism or prisms $g^4$, or, as shown in Fig. 1, the prism between the legs of the lens may be dispensed with.

The glass above described is preferably molded in one piece, and in practice the glasses are arranged end to end, preferably in a straight line, with the outwardly-projecting base-flanges abutting against each other, so as to form bottom walls for the grooves which are designed to receive the cement $x$. With respect to the above it will be noted that the glasses are properly spaced apart and form when assembled permanent pockets for the reception of the cement, and when the cement is introduced and leveled flush with the upper faces of the lenses it is only necessary to give sufficient time for the cement to set, when the substructure may be removed. Upon the removal of the substructure there are no removable molds to be detached from the under side of the pavement.

After the lenses are arranged in position on the substructure flat bars of metal (indicated at H) are arranged between rows of glasses for the purpose of strengthening the cement rib, and when the cement is introduced around this strengthening-bar it will be observed by reference to Fig. 3 that the bar is wholly surrounded by cement, and consequently is not exposed to the attacks of corrosive gases.

In practice the pavements built according to my present invention are preferably constructed as panels—that is, the glasses are arranged in parallel rows from the building to the pavement—and at intervals of, say, ten feet I introduce what I have hereinbefore designated as an "expansion-joint." This expansion-joint is formed by arranging between two rows of glasses a $\Lambda$-shaped removable mold I. When the cement is introduced between the glasses and up to about the top of this mold, I arrange centrally the space between the glasses and parallel with the mold a folded metal strip J, preferably of copper, said strip being preferably folded to present the cross-section shown in Fig. 3—that is, to present an inverted-V-shaped body portion having lateral flanges at the bottom of the legs. The cement is now introduced to embed the side legs of this folded metal strip, and after the cement is leveled a grooving-tool is employed for forming a groove in the surface of the cement immediately above the bent strip of metal. When the cement sets, the removable mold I is removed and tar $x'$ preferably poured into the groove above the bent strip J.

Changes in temperature invariably cause pavements composed wholly or partially of cement to shrink or expand, as the case may be. The so-called "expansion-joint" shown in Fig. 3 will take care of ordinary contraction and expansion and still preserve a watertight joint. Pavements of the character above described are usually constructed during mild or warm weather, and in the event that shrinkage occurs the weakest place in the pavement will be along the expansion-joint, and consequently the cement, should there be any above or below the bent strip, will readily crack on account of the thin body and permit the bent strip to follow the separating edges of the panels. In doing this a straightening action is exerted on the strip, and as the sides of the bent portion pull away from the cement the tar or other soft material in the groove above flows down and fills the spaces so formed. Under warmer temperature it is obvious that the panels will expand, and if they should approach each other beyond the limits defined in the formation of the expansion-joint the thin portions of the cement immediately above and below the strip J on opposite panels first contact with each other and under pressure will crumble. This mashing or crumbling takes place immediately above and below the bent strip J and permits the panels to expand to their fullest extent, and in so expanding preserve the integrity of the panel and locate the rupture or crack along a defined line.

From the above it will be seen that when it is desired to span any width within the limits of strength of the cement and its embedded bars the glasses can be used, each being considered as a unit, every line or row of glasses being made up of the necessary number of glasses or units to constitute the required length of that row. The actual size of the glasses over all is about four inches each way.

So far as I am aware I am the first to employ lenses provided with supporting-legs having flanges which serve the double function of supporting the lenses above the substructure and in forming walls for the supporting-ribs of cement, dispensing with the employment of removable mold-boxes.

Having thus described my invention, what I claim, and desire to secure by Letters Patent, is—

1. In a pavement or the like, lenses, lateral flanges upon said lenses, the adjacent flanges of neighboring lenses abutting to produce the under pavement surface between the lenses, there being a space formed by the said abutting flanges and the side walls of the lenses and opening upon the upper surface of said lenses, and means for binding said lenses together located in said space; substantially as described.

2. The combination with removable supports, of lenses supported thereabove by imperforate legs, said legs abutting against each other and being provided with lateral flanges at their lower edges which are designed to contact with corresponding flanges on adjacent rows of glasses; substantially as described.

3. The combination with a lens having depending walls at its side edges, of outwardly-projecting flanges at the lower edges of said side walls, and ribs near the upper edges of said side walls; substantially as described.

4. The combination with lenses formed with depending side walls arranged to contact with each other, said side walls having outwardly-extending flanges contacting with corresponding flanges on adjacent glasses so as to form a recess of some depth for the reception of cement, a strengthening bar or plate arranged between the side walls of the lenses and embedded in said cement, and cross-ribs of cement between the lenses of a row; substantially as described.

5. The combination with glasses G comprising a lens portion from which depend side walls $g'$, said side walls having base-flanges $g^2$ and ribs $g^3$, said glasses being arranged in parallel rows so as to form deep spaces for the reception of cement between parallel rows of glasses, and relatively shallow spaces between the lenses of a row, and strengthening plates or bars embedded in the cement placed in the deep spaces; substantially as described.

6. The herein-described glass comprising a body portion formed with depending walls flush with the side edges of the body portion, the lower edges of said walls having lateral flanges, and horizontally-arranged ribs near the upper ends of said side walls; substantially as described.

7. The herein-described glass comprising a body portion having depending side walls, and a partition between said side walls formed with an inclined face for deflecting the transmitted rays of light; substantially as described.

8. In an area-spanning pavement, the combination with lenses having depending walls contacting with each other, whereby the under surface of the pavement is composed entirely of glass, deep ribs of cement between the lenses, metallic bars or plates embedded in said deep ribs, and relatively shallow cross-ribs; substantially as described.

9. The combination with two adjacent pavement-panels whose contiguous edges are beveled to form contacting portions, of a bent metal strip whose edges are embedded in the adjacent edges of the panels; substantially as described.

10. In a pavement or the like, a panel having its edge formed of a material of the nature of concrete, said edge being reduced in thickness, whereby when said panel expands against the adjacent pavement-section said reduced edge will be mashed or crumbled; substantially as described.

11. The herein-described expansion-joint, which consists in embedding a bent metal strip in adjacent edges of two panels, and providing a groove above said strip for the reception of a semifluid material; substantially as described.

12. The combination with a removable mold I for forming beveled edges on adjacent panels, and a bent metal strip J having laterally-extending portions designed to be embedded in the cement forming the panels; substantially as described.

13. The combination with contiguous edges of panels whose line of division is formed by oppositely beveling the contiguous edges thereof, and a bent metal plate having laterally-projecting portions embedded in the adjacent edges of the panels at points intermediate the beveled faces thereof; substantially as described.

14. The combination with an area-spanning pavement composed of lenses and cement, strengthening-bars H embedded in the cement, said pavement being divided into panels by grooving the upper and lower faces thereof between two rows of lenses, the grooves weakening the cement at this point, and a bent metal strip embedded in the contiguous edges of the panels and located between these grooves; substantially as described.

15. In an area-spanning pavement, the combination with the lens-glasses G, substantially as described, of cement between said glasses, strengthening metallic bars or plates H embedded in said cement, and bent metal plates J; substantially as described.

16. In a pavement, a plurality of lenses having depending walls at their side edges, outwardly-projecting flanges at the lower edges of said side walls, the said flanges of contiguous lenses projecting toward each other, and ribs near the upper edges of said side walls; substantially as described.

17. In a pavement, a plurality of lenses, each lens having a body portion formed with depending walls flush with the side edges of said body portion, the lower edges of said walls having lateral flanges, and horizontally-arranged ribs near the upper ends of said side walls, the said flanges of contiguous lenses projecting toward each other; substantially as described.

In testimony whereof I hereunto affix my signature, in the presence of two witnesses, this 18th day of May, 1901.

PRESTON M. BRUNER.

Witnesses:
GEORGE BAKEWELL,
F. R. CORNWALL.